F. RALPH.
Breech-Loading Fire-Arm.
No. 198,154. Patented Dec. 11, 1877.
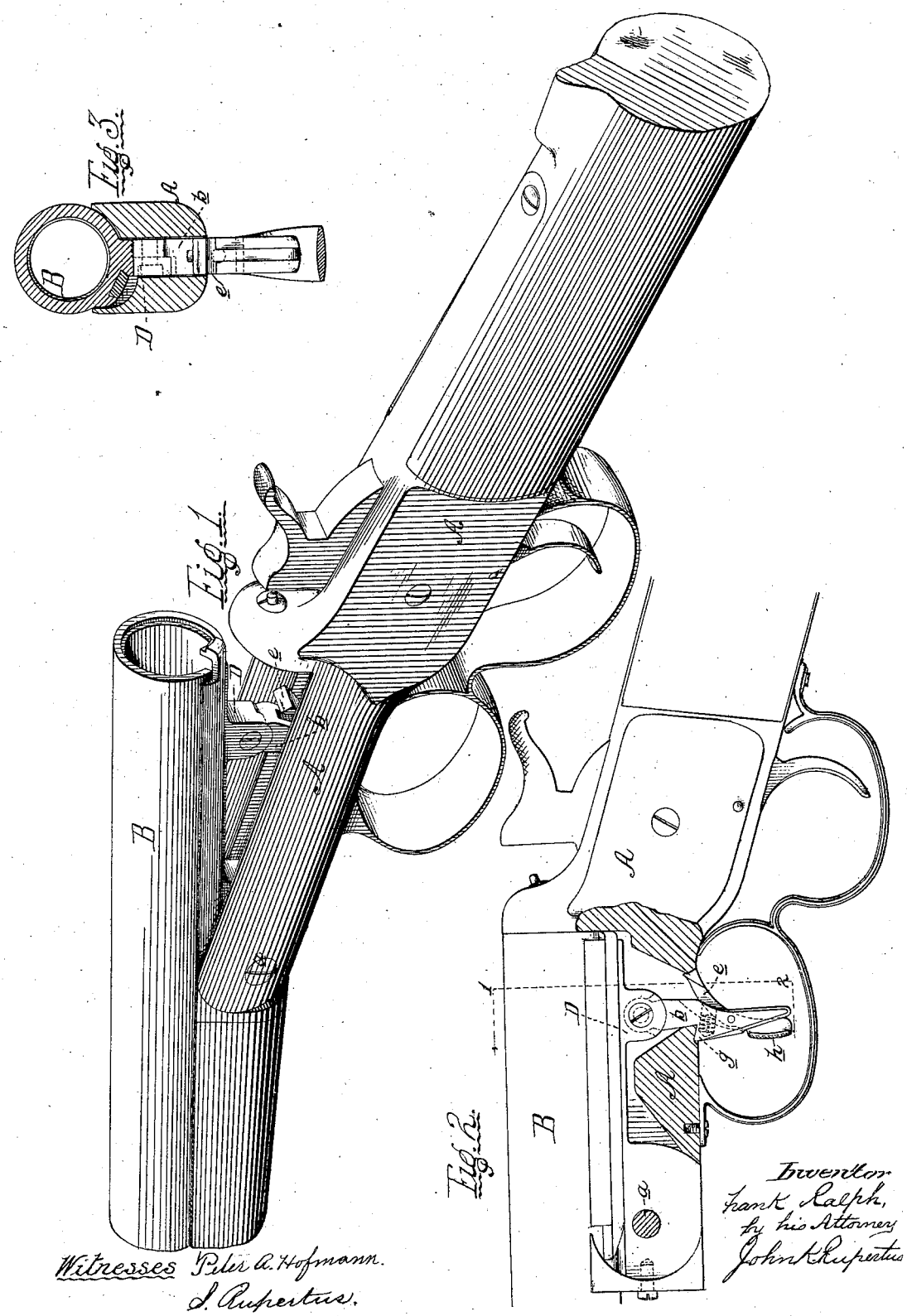

UNITED STATES PATENT OFFICE.

FRANK RALPH, OF NEW YORK, N. Y., ASSIGNOR TO THOMAS G. CONWAY, OF SAME PLACE.

IMPROVEMENT IN BREECH-LOADING FIRE-ARMS.

Specification forming part of Letters Patent No. 198,154, dated December 11, 1877; application filed November 23, 1877.

*To all whom it may concern:*

Be it known that I, FRANK RALPH, of the city, county, and State of New York, have invented a new and useful Improvement in Breech-Loading Fire-Arms, of which the following is a specification:

The object of my invention is to securely lock the pivoted barrel or barrels of a breech-loading fire-arm in such a manner as to prevent the accidental opening of the breech; and this object I attain in a manner too fully described hereinafter to need preliminary description here.

In the accompanying drawing, Figure 1 is a perspective view of a breech-loading fire-arm with my improved lock or catch attached; Fig. 2, a side view of the same, partly in section; Fig. 3, a transverse sectional view on the line 1 2, Fig. 2.

A is the frame, containing the lock mechanism of a breech-loading fire-arm, and extending a short distance forward under the barrel B, the end of the frame A and a projection on the barrel forming a hinge or pivot, the barrel and frame being connected by a screw or pin, $a$. Near the breech end of the barrel is a projection, D, to which is hung the catch $b$. To the catch is pivoted a dog, $e$, the catch and dog extending through a slot in the frame, (see Figs. 2 and 3,) and being protected by the trigger-guard, which extends forward under and is secured to the frame A. The catch or lock $b$ being loosely pivoted to the projection D is free to turn on the same, and has formed on one edge the shoulder $g$, which locks under the frame at one end of the slot in the same, one end of the dog $e$, pivoted to the catch $b$, bearing against the opposite end of the slot, thereby preventing the accidental displacement of the catch $b$ until operated in the manner described hereinafter, when the barrel is locked in its proper position for firing.

The dog $e$ extends to the opposite edge of the catch $b$, and is formed into an enlargement, $h$, the catch and the dog being kept against the ends of the slot in the frame by a spring, the shape and position of which is immaterial.

When it is desired to open the breech of the fire-arm, so as to examine the interior of the barrel or to extract the cartridge-shell, a finger is inserted in the guard under the frame, and by a slight pressure on the enlargement $h$ of the dog $e$ the opposite end of the same is thrown up and disconnected from the edge of the slot, and the shoulder $g$ is released from the under side of the frame, when, owing to the weight of the barrel, the outer end is depressed and the breech end and the lock or catch elevated. (See Fig. 1.) To restore the barrel to the position for firing, the breech end is simply depressed until the lock, owing to the spring, resumes the position described and shown.

It will be evident that, while I have shown and described my invention as applied to a breech-loading fire-arm with but one barrel, it is also applicable to fire-arms with more than one barrel.

What I claim as my invention is—

The combination, with the lock or catch of the pivoted barrel or barrels, of the dog $e$.

In testimony whereof I have signed my name to this specification in the presence of two subscribing witnesses.

FRANK RALPH.

Witnesses:
   FREDK. WHEELER,
   J. V. ARENTS.